Dec. 23, 1958

T. L. FAWICK 2,865,183

FLEXIBLE-COUPLING ASSEMBLY FOR CONNECTING SHAFTS AND THE LIKE

Filed March 27, 1957

INVENTOR.
THOMAS L. FAWICK
BY Willard D. Eakin
ATTORNEY

United States Patent Office 2,865,183
Patented Dec. 23, 1958

2,865,183

FLEXIBLE-COUPLING ASSEMBLY FOR CONNECTING SHAFTS AND THE LIKE

Thomas L. Fawick, Cleveland, Ohio

Application March 27, 1957, Serial No. 648,880

7 Claims. (Cl. 64—10)

This invention relates to flexible couplings for drivingly connecting power transmitting shafts and the like and adapted to permit misalignment of the driving and driven members.

Its chief objects are to provide an assembly of this type adapted to compensate for pronounced off-set of the axes as well as angular misalignment; to provide that result without great loss of power and without heavy bearing load in the functioning; to provide desirable cushioning of torque and of vibration; to provide simplicity and economy of construction, assembly and disassembly; to provide for simplicity and economy of repair by replacement of parts; and to provide a coupling adapted to permit the coupled driving and driven shafts or the like to have different axial spacing from each other, as in the case of a marine propeller shaft having a resilient thrust bearing or bearings that permit the propeler shaft to move appreciably forward in relation to the driving shaft when forward-drive torque is applied, or appreciably backward when reverse-drive torque is applied.

Some features of the present assembly are more broadly claimed in my United States Patent No. 2,727,369.

Figures 1, 2:
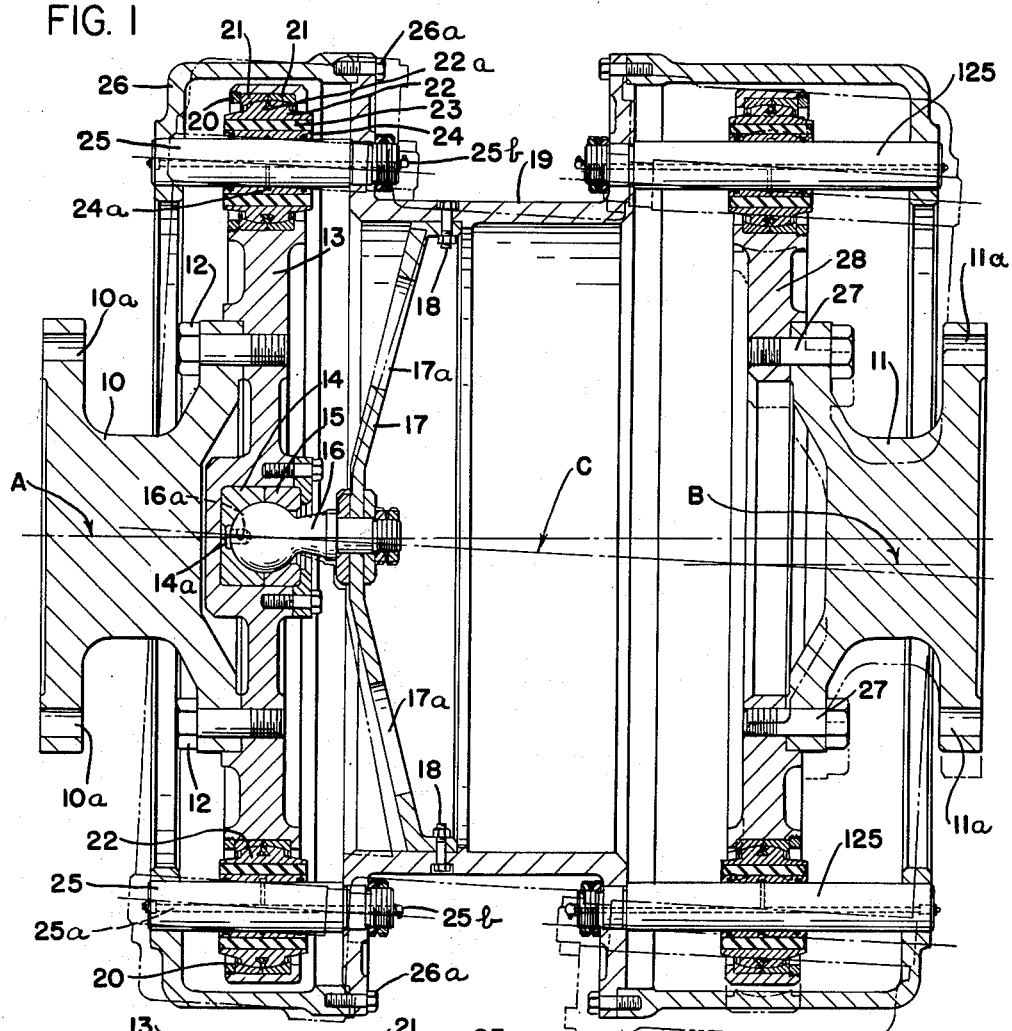
Fig. 1 is an axial section of an assembly embodying my invention in its preferred form.
Fig. 2 is a fragmentary axial section, on a larger scale, of a portion of the same.

Referring first to Figs. 1 and 2, the assembly comprises hub members 10 and 11 formed with bolt holes 10a, 10a, 11a, 11a for securing them to respective shaft heads, not shown.

Upon the drive shaft hub 10 is secured by bolts 12, 12 a generally disc-shaped coupling element 13 formed at its center with a socket in which are mounted two female members 14, 15 of a ball-and-socket joint and, within them, a ball element formed on a stem member 16 which is secured to and projects from the center of a conical disc 17. This disc preferably is formed with access holes 17a, 17a for access to bolts 18, 18 by which the disc 17 is secured to a cross-sectionally U-shaped ring member 19, the members 17 and 19 being parts of a torque-transmitting spider.

The socket member 14 and the ball of the member 16 preferably are formed with respective lubricant pockets 14a, 16a.

The disc member 13 is formed near its outer periphery with a set of circumferentially spaced sockets in each of which is mounted, and retained by a threaded ring 20, a torque-cushioning and transmitting slide-bearing and ball-and-socket assembly (see Fig. 2) of which the outermost members are a pair of socket rings 21, 21 which have mated with them the spherically curved outer surface of a ring 22, preferably formed with a lubricant groove 22a in its spherical face.

A cushioning ring 23, preferably of an oil-resistant synthetic rubber such as neoprene, is mounted between the outer, ball ring 22 and an inner, slide-bearing ring 24, which preferably has on its inner, slide-bearing face a lubricant-distributing groove 24a and a pair of lubricant-retaining O rings mounted in respective grooves in the inner face of the ring.

Preferably the cushioning ring 23 is mounted under substantial radial compression, as by being made somewhat over-size and secured as by vulcanized adhesion to the inner ring 24 and then forced axially, along with the inner ring, into the outer ring, in a procedure well known in the making of compression-type bushing assemblies.

Slidably extending through each of the slide-bearing rings 24 is a cylindrical slide-bar 25 which is mounted in and projects axially from the adjacent annular flange of the U-section ring 19.

Preferably an L-section ring 26, as a guard and for holding the outer ends of the slide-bars 25, is secured by bolts 26a, 26a to the aforesaid flange and is formed with sockets occupied by the outer end portions of the slide-bars. Each slide-bar preferably is provided with a lubricant channel 25a and, preferably at the end of the bar that is within the space defined by the U-section of the member 19, with an oil or grease fitting 25b.

The driven hub member 11 has secured to it by bolts 27, 27 a coupling element in the form of a generally disc-shaped ring 28. Associated with it and with the spider 17—19 is a torque-transmitting assembly corresponding to the assembly just described as being associated with the coupling element 13 and the spider, except that the slide-bars, 125, 125, at this end of the spider are shown as being longer than the slide bars 25, and project rearwardly from the spider instead of forwardly. The words rearwardly and forwardly are used only for convenience and brevity, as either of the hub members can be the drive member and the other the driven member.

In Fig. 1 the broken lines indicate the positions assumed by parts of the assembly when, with the member 13 still in its full-line position, the hub-and-disc assembly 11, 27, 28 is at a position such that its axis, B, is parallel with the axis, A, of the hub-and-disc assembly 10, 12, 13, but, without angular misalignment of the two axes, is off-set downwardly with relation to the axis A.

In that situation the spider's axis, C, is in angular relation, as shown, to both of the axes A and B.

The slide-bar 25 at the bottom of the assembly (see Fig. 2) has slid to the left in its slide-bearing 24 and has departed from its right-angle relation to the disc 13, its change of angular relation being permitted in part by deformation of the rubber bushing 23 and in part by clockwise rotation of the ball member 22 in its socket 21—21. The opposite of course has occurred at the top of the assembly, as shown by the broken lines in Fig. 1. In the rotation of the coupling the conditions of course are reversed as each slide-bearing assembly moves through a half-cycle of revolution of the coupling, the adjacent parts of the spider having a back-and-forth axial "weaving" movement in relation to the individual slide-bearing assembly.

In the case of a propeller drive for a boat the propeller shaft, and with it the hub member 11, can operate at different fore-and-aft positions, as above mentioned, and throughout a long range of tolerance because of the length of the slide-bars 125.

The spider 17—19 is so held in position axially of the hub member 10, by the ball-and-socket connection 14—16, that the length of the slide-bars 125 is sufficient to provide an ample range of movement for them in their slide-bearings 24, even when the spider 17—19 operates at a large angle of misalignment in relation to the hub member 10.

The axial positioning of the spider's ball-end member 16 also keeps the slide-bars 125 in proper relation to the disc member 28 to permit the weaving movement, with the disc member 28 at different positions fore-and-aft of the assembly.

Figure 3:
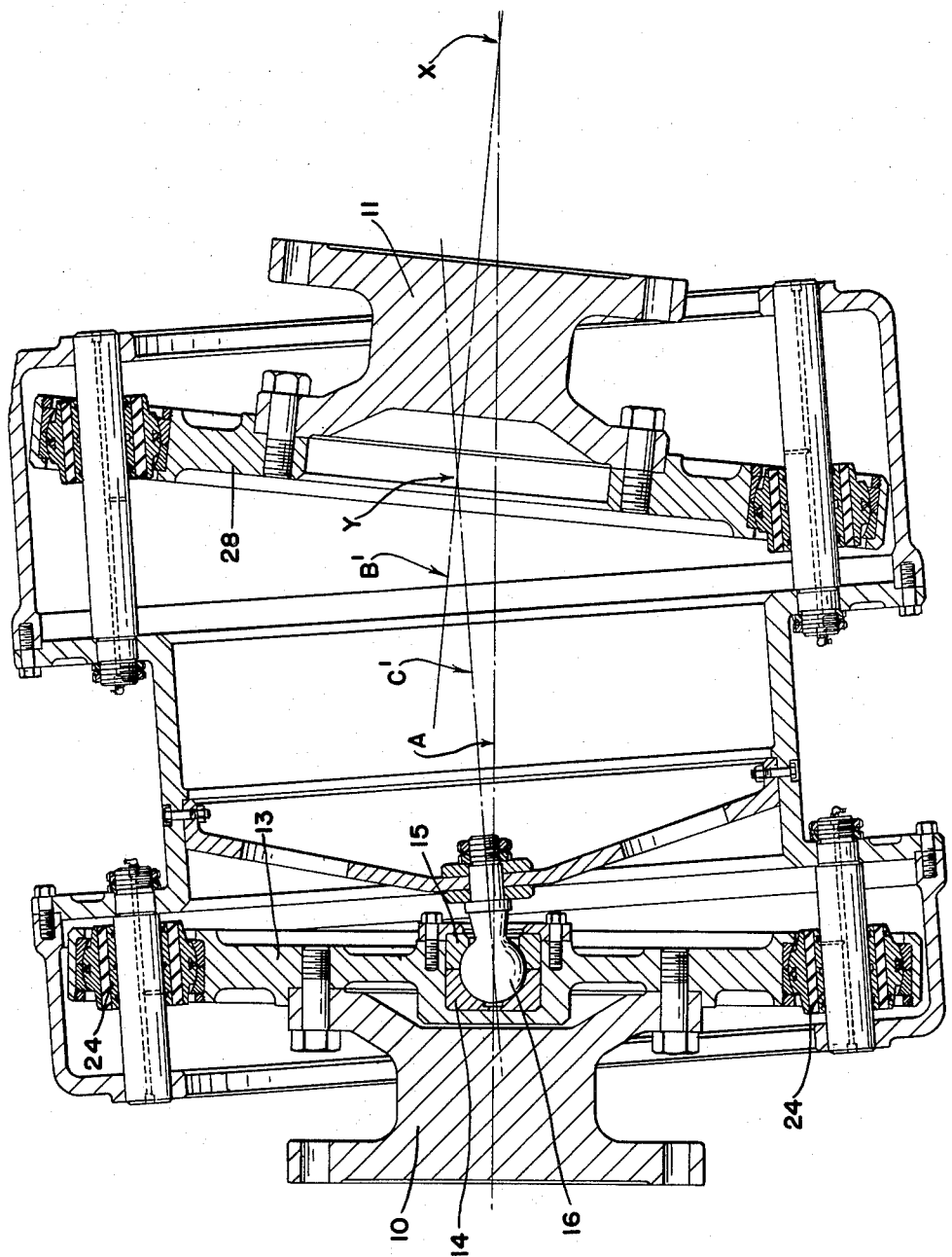
Fig. 3 is an axial section of the same illustrating an extreme condition of off-set of the axes and of angular misalignment.

Fig. 3 shows the relative positions when the driving member 10 and the driven member 11 are in an extreme relationship that can be considered as a combination of axis-off-set and angular misalignment, the extended axis B' of the driven member intersecting or passing the extended axis A' of the drive member at a position, X, remote from the center of the space between disc members 13 and 28. The degree of such remoteness is dependent upon the distance apart of said disc members, assuming the axes A and B' to remain in the same angular relationship.

In this situation the spider's axis, C', of course intersects the axis A of the drive member 10 at the center of the ball-and-socket joint 14—16, but intersects or passes the axis B' of the driven member 11 at Y.

The ball-and-socket connections of the slide-bearing rings 24 with the disc member 13 permit the spider to work at a greater angle to the axis of the hub member 10 than would be permitted by deformation of the rubber bushings alone. Yet vibrations and the torque are well cushioned by the rubber bushings.

The same advantages of course are present also at the other end of the assembly.

Modifications are possible without departure from the scope of the invention as defined in the appended claims.

I claim:

1. A flexible-coupling assembly comprising a pair of coupling members presented to each other in axially spaced relation and a torque-transmitting spider between said members, said spider having at each of its ends, and, at a substantial distance from its axis of rotation, a set of circumferentially spaced driving units engaged with the adjacent one of said members, and each of said units comprising axially disposed slide-bearing means and a ball-and-socket connection in series with each other for torque transmission.

2. An assembly as defined in claim 1 and including positioning means at the axis of revolution of one of the defined coupling members for resisting axial movement of the spider in relation to that one of the said members.

3. An assembly as defined in claim 2 in which the positioning means at the specified axis comprises a ball-and-socket joint.

4. An assembly as defined in claim 1 in which each of the defined units comprises a torque-cushioning body of a substance having substantially the resilient deformability of vulcanized soft-rubber which insulates the spider from the coupling member with which the unit is drivingly engaged.

5. A flexible-coupling assembly comprising a pair of coupling members presented to each other in axially spaced relation and a set of circumferentially spaced driving units for transmitting torque from one to the other of said members, each of said units comprising axially disposed slide-bearing means and a ball-and-socket connection in series with each other, as parts of the respective unit, for torque transmission.

6. An assembly as defined in claim 5 in which each of the defined units comprises a cushioning body of a substance having substantially the resilient deformability of vulcanized soft-rubber which, as a part of the respective driving unit, is in series with the defined slide-bearing means and the defined ball-and-socket connection.

7. A flexible-coupling assembly comprising a pair of coupling members presented to each other in axially spaced relation and a set of circumferentially spaced driving units for transmitting torque from one to the other of said members, each of said units comprising a ball-and-socket connection and, in series therewith for transmission of torque, a cushioning body of a substance having substantially the resilient deformability of vulcanized soft-rubber.

References Cited in the file of this patent

UNITED STATES PATENTS

| | | |
|---|---|---|
| 1,396,979 | Thomas | Nov. 15, 1921 |
| 2,727,369 | Fawick | Dec. 20, 1955 |

FOREIGN PATENTS

| | | |
|---|---|---|
| 580,482 | Germany | July 12, 1933 |